US008453978B2

(12) United States Patent
Carsten

(10) Patent No.: US 8,453,978 B2
(45) Date of Patent: Jun. 4, 2013

(54) CABLE SYSTEM

(75) Inventor: Thrue Carsten, Horsens (DK)

(73) Assignee: ABB Technology Ltd., Zürich (CH)

(*) Notice: Subject to any disclaimer, the term of this patent is extended or adjusted under 35 U.S.C. 154(b) by 505 days.

(21) Appl. No.: 11/630,479

(22) PCT Filed: Jun. 23, 2005

(86) PCT No.: PCT/IB2005/001778
§ 371 (c)(1),
(2), (4) Date: Jul. 8, 2008

(87) PCT Pub. No.: WO2006/000889
PCT Pub. Date: Jan. 5, 2006

(65) Prior Publication Data
US 2009/0001227 A1 Jan. 1, 2009

(30) Foreign Application Priority Data
Jun. 24, 2004 (SE) ........................................ 0401668

(51) Int. Cl.
F16L 3/00 (2006.01)
(52) U.S. Cl.
USPC ................................. 248/49; 248/65; 248/73

(58) Field of Classification Search
USPC ................................. 248/49; 174/48, 68.3, 95
See application file for complete search history.

(56) References Cited

U.S. PATENT DOCUMENTS

| 6,198,043 | B1 * | 3/2001 | Hoffmann | 174/480 |
| 6,412,733 | B1 | 7/2002 | Grzemski | |
| 6,489,566 | B1 * | 12/2002 | Durin | 174/135 |
| 2004/0104322 | A1 * | 6/2004 | Hennequin | 248/241 |
| 2004/0144898 | A1 * | 7/2004 | Spagnoli | 248/68.1 |

FOREIGN PATENT DOCUMENTS

| DE | 29700613 | 4/1997 |
| EP | 1257032 | 11/2002 |

OTHER PUBLICATIONS

PCT/ISA/210—International Search Report.

* cited by examiner

Primary Examiner — Amy J Sterling
(74) Attorney, Agent, or Firm — Venable LLP; Eric J. Franklin

(57) ABSTRACT

A method for mounting a cable duct on a supporting surface. The cable duct includes openings for applying attachment elements, forming parts of the supporting surface into at least three hitches. The hitches are placed corresponding to the openings in the cable duct and the cable duct is mounted on the surface through the hitches.

11 Claims, 5 Drawing Sheets

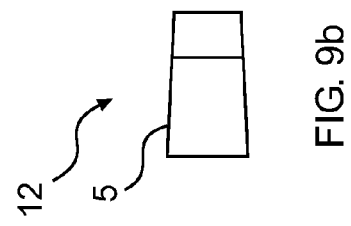
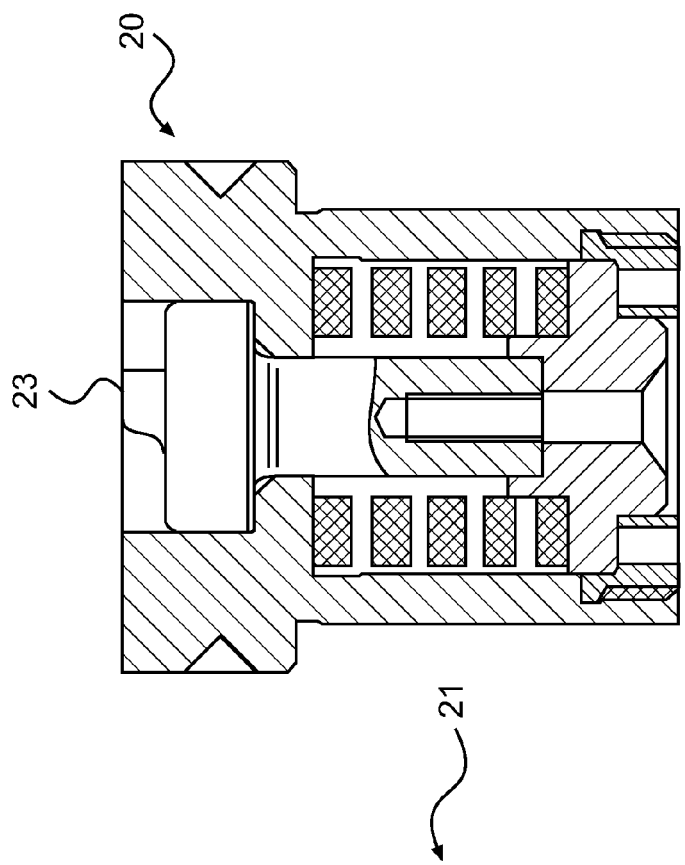
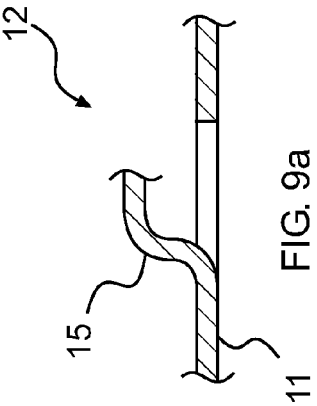
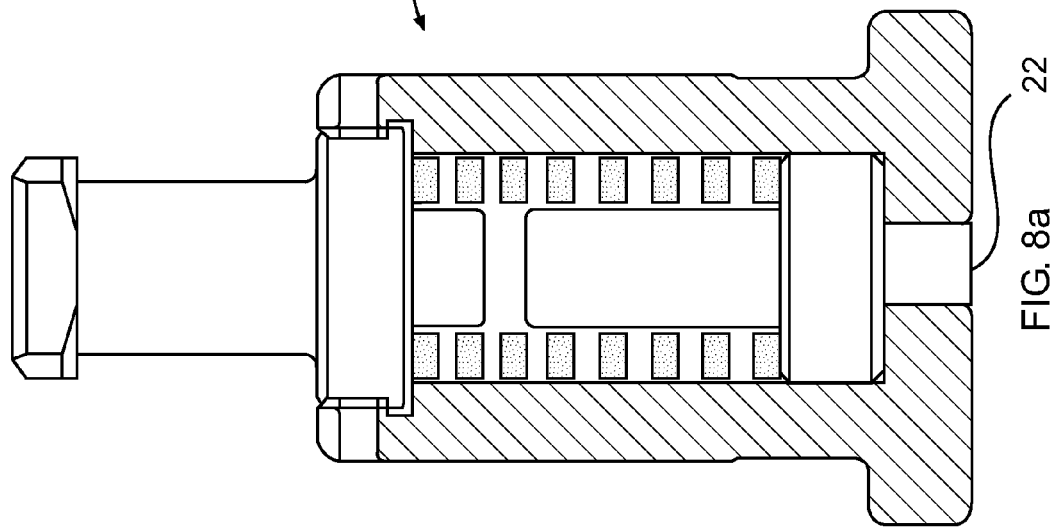

CABLE SYSTEM

CROSS-REFERENCE TO RELATED APPLICATIONS

This application claims priority to Swedish patent application 0401668-9 filed 24 Jun. 2004 and is the national phase under 35 U.S.C. §371 of PCT/IB2005/001778 filed 23 Jun. 2005.

TECHNICAL FIELD

The present invention relates to a method for mounting a cable duct on a supporting surface, which cable duct comprises openings for applying attachment means. The present invention further relates to a cable duct mounted on a supporting surface by hitching means. The present invention furthermore relates to a die set means comprising a male part and a female part, the male part and the female part being deigned to operate in opposition to each other. The present invention also relates to the use of a die set means.

BACKGROUND ART

Cable duct systems are used for routing and protecting data, fiber-optic, video and/or power cabling as well as hydro, oil and/or gas cabling. Such systems may be provided on supporting surfaces, with attachment means such as screws, rivets, tape or the like. By mounting the ducts with a screw or a rivet, the screw tip or rivet tip penetrating the plating will limit the mounting surface on the plating work piece. The cable ducts often comprise a channel with a u-shaped cross-section and a lid allowing easy access when installation of additional cables, repair and reconfiguration is done. The cable duct usually comprises pre-fabricated openings for penetration of said attachment means. The cable ducts are normally of flexible material such as plastic.

Such a system is described in the document U.S. Pat. No. 6,412,733 B1. The described system provides an improved support bracket assembly that can be easy reinstalled and support heavy loads. However the system is complex to install and comprises a large number of components.

The object of the present invention is to fulfil the need for a simpler and more flexible method to assemble a cable duct system and mounting a cable duct on a supporting surface.

SUMMARY OF THE INVENTION

This object is achieved by forming parts of said supporting surface into at least three hitching means. The hitching means are placed corresponding to the openings in the cable duct. The hitching means are arranged to co-operate with the openings. The hitching means are used to lock the cable duct in position.

One advantage is that a minimum of components is used. Another advantage is that no tool for loose attachment means is needed; the mounting is thus done quickly and with no former arrangement thereto. Therefore, the method according to the invention also saves production time and material.

In a preferred embodiment according to the invention said hitching means comprise a main part that is not in the same plane as the supporting surface.

In another preferred embodiment according to the invention said hitching means comprise a locking surface. The locking surface is positioned with an angle between substantially zero degrees and perpendicular to the supporting surface.

In yet another preferred embodiment according to the invention said hitching means comprise a neck, a heel and a locking surface. The neck is attached perpendicular to the supporting surface. The heel joins the locking surface and the neck perpendicular to each other. This is an advantage as the hitching means catch the cable duct. Further, for the construction it is a space-saving advantage that no attachment means takes up considerable space on the opposite side of the plating behind the cable ducts.

In another preferred embodiment according to the invention said hitching means are formed in the supporting surface with the necks in the same directions and every second supporting surfaces in the opposite directions according to each other.

In another preferred embodiment according to the invention said hitching means are formed on the supporting surface with the main parts directed from the supporting surface and the locking surfaces of two adjacent hitching means directed in the opposite directions in relation to each other.

In another preferred embodiment according to the invention at least some of said hitching means are hook-shaped. This is an advantage as the hook is easily manufactured.

In another preferred embodiment according to the invention at least some of said hitching means is formed as a protrusion of the supporting surface is forming any of a: wave, crease, bulge, step. This is also an advantage as a crease is also easily manufactured.

In another preferred method according to the invention producing said hitching means simultaneously produces corresponding holes in the supporting surface.

In another preferred method according to the invention a cable duct is mounted on a supporting surface by hitching means produced with a method according to the present invention.

In another preferred method according to the invention a die set means comprises a male part and a female part. The male part and the female part are deigned to operate in opposition to each other. Said die set is designed to form parts of a supporting surface into a hitching means. The hitching means is intended for mounting a cable duct on said supporting surface through said hitching means.

Another preferred method according to the invention is the use of a cable duct arranged to carry cables or hoses for any of the list of: power transmission, data transmission, optical signal transmission, hydraulic fluid, cooling fluid, lubricating fluid, gas, compressed air.

BRIEF DESCRIPTION OF THE DRAWINGS

The present invention will be described in more detail in connection with the enclosed schematic drawings.

FIG. 8a shows the female part of a die set means according to a preferred embodiment of the invention, FIG. 8b shows the male part of a die set means according to a preferred embodiment of the invention, FIG. 9a shows a side-view of a hitching means according to a preferred embodiment of the invention, FIG. 9b shows a front-view of a hitching means according to a preferred embodiment of the invention.

DESCRIPTION OF THE PREFERRED EMBODIMENTS

Figure 1:
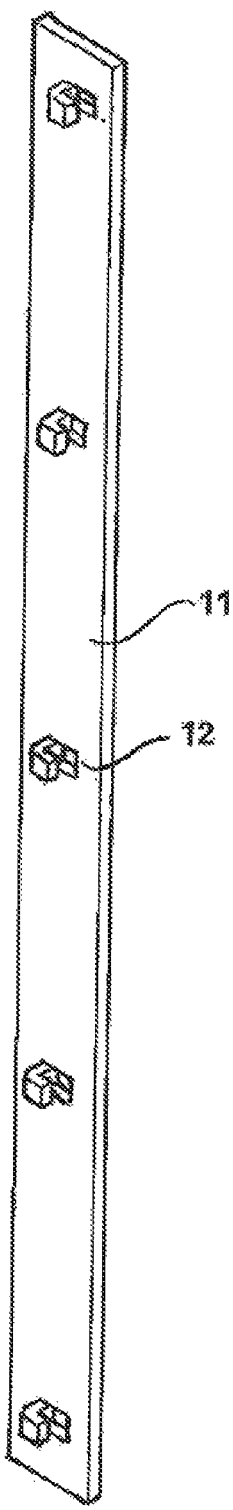
FIG. 1 shows a perspective view of a support surface with hitching means according to a preferred embodiment of the invention.

FIG. 1 shows a perspective view of a supporting surface 11 comprising hitching means 12 according to an embodiment of the invention. The supporting surface is a plating work piece. The plating work piece is prepared by establishing a plurality of a hitching means, in this case hooks. The hitching means are established on the plating work piece with a relative position adapted to the actual length between the openings in the present cable duct. The work piece is, for instance, sheets of plating of metal.

Figure 2:
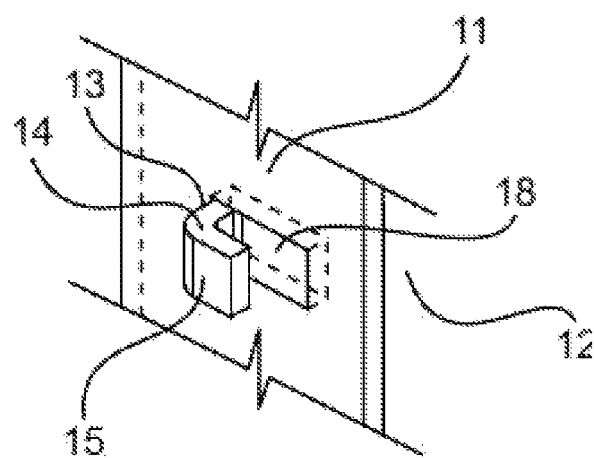
FIG. 2 shows a perspective view of one hitching means according to a preferred embodiment of the invention.

FIG. 2 shows a perspective view of one hitching means 12 on a supporting surface 11 according to an embodiment of the invention. Each hitching means geometry is adapted to the dimensions of a corresponding opening in the cable duct. The hitching means comprise a neck 13, a heel 14 and a locking surface 15. The neck is attached perpendicular to the supporting surface and the heel joins the locking surface and the neck perpendicular to each other. The trans-forming of a part of the surface to a hitching means leaves a hole (18) in the surface.

Figure 3:
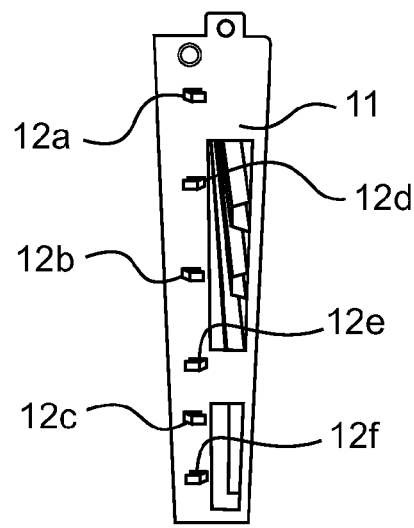
FIG. 3 shows a supporting surface of a construction provided with hitching means according to a preferred embodiment of the invention.

FIG. 3 shows a supporting surface of a construction provided with hitching means according to a preferred embodiment of the invention. The supporting surface is completed with hitching means for mounting a cable duct. Every second hitching means is placed in opposite direction to the others. In this case there are five hitching means. This means that three of those that are the first 12a, the third 12b and the fifth 12c are turned left on the supporting surface and the second 12d and the fourth 12e are turned to the right. The supporting surface is, for instance, a thin plating construction of galvanized plating.

Figure 4:
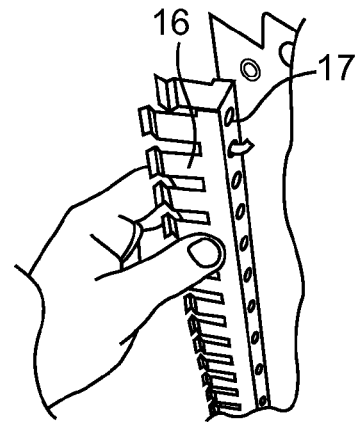
FIG. 4 shows one step in the method according to a preferred embodiment of the invention showing a cable duct being attached to the structure shown in FIG. 3.

FIG. 4 shows the plating construction of galvanized plating, and a plastic cable duct 16 with openings 17. This invention relates to mounting cable ducts that typically have openings with a relative distance in the range of 50-300 mm. The cable duct in the figure has openings with a relative distance of about 200 mm. Consequently the corresponding hitching means is located at the same relative distance. The cable duct typically has a length in the range of 500-2000 mm. The cable duct in the figure has a length of about 900 mm.

Figure 5:
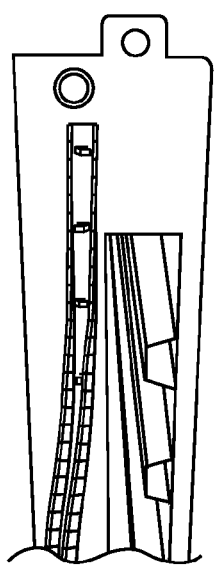
FIG. 5 shows a further step in the method according to a preferred embodiment of the invention.
Figure 6:
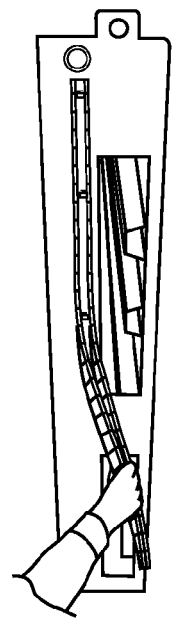
FIG. 6 shows a still further step in the method according to a preferred embodiment of the invention.

FIGS. 4-6 show a method for assembling cable ducts. As a first step in the method according to an embodiment of the invention, FIG. 4 shows how the cable duct is attached by catching the first hitching means on the supporting surface.

The cable duct is now turned over the following hitching means one by one as shown in FIGS. 5 and 6. FIG. 5 shows the next step in the method according to an embodiment of the invention. The cable duct is mounted by bending the cable duct in one direction to catch the next hitching means. Then FIG. 6 shows the following step by which the cable duct is bent in the opposite direction to catch the next hitching means. The mounting method demands that the cable duct is flexible, for example produced in plastic. The cable duct might also be a bit loose before mounting the cables, but the mounting of the cables will adjust this slack. The hitching means together lock the cable duct in the preferred position.

Figure 7:
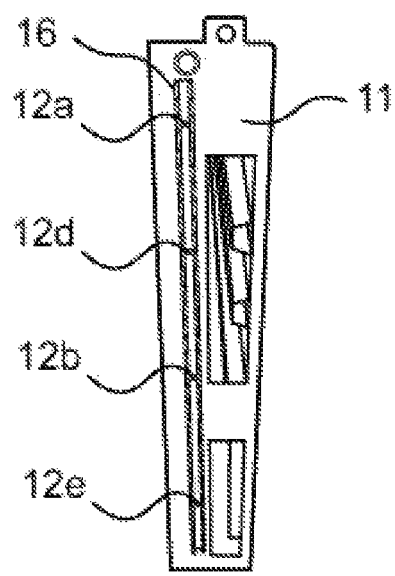
FIG. 7 shows a cable duct assembled with hitching means according to a preferred embodiment of the invention.

FIG. 7 shows the cable duct mounted on the five mounting hooks. The cable duct is ready for running wires through the cable duct. The cable duct is also completed with a closing lid, not shown in the figure, after the content, in this case wires, is put in place.

Figure 10:
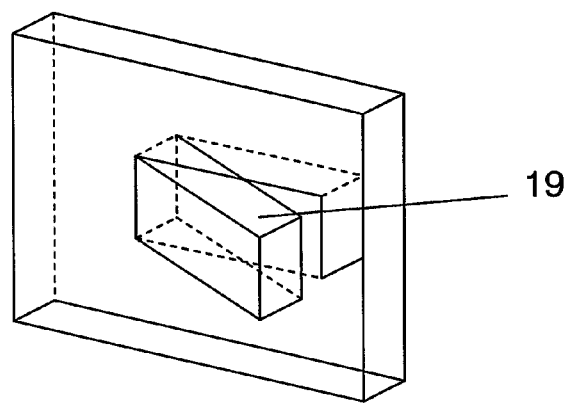
FIG. 10 shows a perspective view of one hitching means according to another preferred embodiment of the invention.

FIG. 10 shows a perspective view of one hitching means 19 according to another preferred embodiment of the invention.

Figure 11:
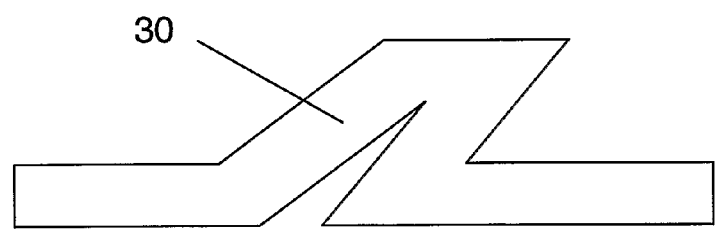
FIG. 11 shows a perspective view of one hitching means according to yet another preferred embodiment of the invention.

FIG. 11 shows a perspective view of one hitching means 30, a fold according to yet another preferred embodiment of the invention.

The hitching means are, for instance, fabricated through a stamping process by using a specially adapted tool, a die set means. The die set means is mounted on a die stamping machine. Such a die stamping machine usually comprises a press ram, a press bed, guiding means and a tool comprising an upper part and a lower part, in this case the die set means. FIG. 8a and FIG. 8b show such a die set means. The die set means comprise a male part 20 and a female part 21. The male part and the female part comprise parts 22, 23 designed to match and mould desired forms. In the die stamping machine an upper part of the die set means, which may be either the female part or the male part, is mounted on the press ram, not shown in the figure. A lower part, which is the corresponding female part or male part of the die set means, is mounted to an intermediate bolster plate which is assembled on the press bed, also not shown in the figure. To form the shape of the hitching means a stroke action is performed with the press ram. The male and female parts then meet operating in opposition to form the shape of the hitching means and punch holes (18), if the embodiment requires a hole, in the metal sheet. The die stamping machine moulds the hitching means. The guiding means, also not shown in the figure, are used to ensure alignment between the upper and the lower halves of the die set means. To provide the support surface with several hitching means, multiple stroke actions may be performed with a single die set means. Another method to provide the supporting surface with several hitching means is to provide the die stamping machine with a number of die set stations, each comprising a die set means, and produce the hitching means by means of a single stroke of the press arm. The die stamping machine may be manually operated or operated through a computer-controlled process. The die stamping machine may be powered by electrical or hydraulic drives or the like.

The mounting method is suitable for all plating constructions, where cable ducts are mounted, for instance in control cabinets, wall mounting 40 and/or mounting on any thin surface, for instance on a vehicle.

The invention claimed is:

1. A method for mounting a cable duct on a supporting surface, which cable duct comprises openings for applying attachment elements, the method comprising:

forming a row including at least three hitches from portions of said supporting surface such that the hitches are integral with the supporting surface, wherein every other hitch in the row of hitches is arranged opposite direction, wherein the hitches are arranged to cooperate with the openings in the cable duct; and mounting said cable duct on said supporting surface through said hitches by bending the cable duct in a first direction to engage a first hitch and bending the cable duct in a second direction opposite the first direction to engage a next hitch, such that the openings in the cable duct cooperate with the hitches, whereby the hitches mount the cable duct on the supporting surface and lock the cable duct in position relative to the supporting surface.

2. The method according to claim 1, wherein at least one of said hitches comprises a main part that is not in a same plane as the supporting surface.

3. The method according to claim 1, wherein at least one of said hitches comprises a locking surface, which locking surface is positioned with an angle between about zero degrees and perpendicular to the supporting surface.

4. The method according to claim 1, wherein at least one of said hitches comprises a neck, a heel and a locking surface, which neck is formed perpendicular to the supporting surface and which heel joins the locking surface and the neck substantially at right angles to each other.

5. The method according to claim 1, wherein at least some of the said hitches are hook-shaped.

6. The method according to claim 1, wherein a protrusion of the supporting surface is forming any of a: wave, crease, bulge, step.

7. The method according to claim 1, wherein said hitches are formed on the supporting surface with the main parts directed from the supporting surface and the locking surfaces of two adjacent hitches directed in the opposite directions in relation to each other.

8. The method according to claim 4, wherein said hitches are formed in the supporting surface with the necks in the same directions from the supporting surface and the locking surfaces of two adjacent hitches in the opposite directions in relation to each other.

9. The method according to claim 1, wherein producing said hitches simultaneously produces corresponding holes in the supporting surface.

10. The method according to claim 1, further comprising:
    utilizing the cable duct to carry cables or hoses for any of the list of: power transmission, data transmission, optical signal transmission, hydraulic fluid, cooling fluid, lubricating fluid, gas, compressed air.

11. The method according to claim 1, wherein said cable duct is mounted on said supporting surface through said hitches without utilizing tools.

\* \* \* \* \*

UNITED STATES PATENT AND TRADEMARK OFFICE
CERTIFICATE OF CORRECTION

| | | |
|---|---|---|
| PATENT NO. | : 8,453,978 B2 | Page 1 of 1 |
| APPLICATION NO. | : 11/630479 | |
| DATED | : June 4, 2013 | |
| INVENTOR(S) | : Carsten | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this
Sixteenth Day of December, 2014

Michelle K. Lee
*Deputy Director of the United States Patent and Trademark Office*